United States Patent [19]
DelGigante

[11] Patent Number: 5,484,288
[45] Date of Patent: Jan. 16, 1996

[54] APPARATUS FOR TEACHING INSCRIPTION OF CHARACTERS

[76] Inventor: Michael DelGigante, 2168 60 St., Brooklyn, N.Y. 11204

[21] Appl. No.: 218,122

[22] Filed: Mar. 25, 1994

[51] Int. Cl.⁶ ............................................. G09B 11/04
[52] U.S. Cl. ..................... 434/163; 434/162; 434/159; 434/232
[58] Field of Search ..................... 434/162, 163, 434/165, 161, 160, 159, 156, 228, 227, 232

[56] References Cited

U.S. PATENT DOCUMENTS

| | | |
|---|---|---|
| Re. 29,033 | 11/1976 | Lapeyre . |
| 531,018 | 12/1894 | Briggs et al. . |
| 987,274 | 3/1911 | Westerberg . |
| 1,599,350 | 9/1926 | Roesch . |
| 2,262,924 | 11/1941 | Coffrin et al. . |
| 3,751,825 | 8/1973 | Barrett . |
| 3,846,826 | 11/1974 | Mueller . |
| 4,492,582 | 1/1985 | Chang et al. . |

FOREIGN PATENT DOCUMENTS

| | | | |
|---|---|---|---|
| 3232787 | 3/1984 | Germany | 434/162 |
| 2150730 | 7/1985 | United Kingdom | 434/162 |

OTHER PUBLICATIONS

Optoelectronics–Theory and Practice–Edited by Alan Chappell–Published by McGraw–Hill Book Co–Circa 1990 (pp. 374–376).

*Primary Examiner*—Gene Mancene
*Assistant Examiner*—Jeffrey A. Smith

[57] ABSTRACT

Teaching apparatus is disclosed having a keyboard for selecting a character to be inscribed, an inscription panel for supporting writing material, and control apparatus for displaying the selected character under the inscription panel; each character is developed bit by bit along a writing stroke or strokes, and the rate of sequencing of the bits is regulated so as to be conveniently followed by the user in executing the inscription strokes. A supply roll of inscription material is provided at the right of the inscription panel so that a sequence of upright characters may be inscribed by drawing a previously inscribed character to the left and drawing a fresh area of writing material over the inscription panel.

2 Claims, 3 Drawing Sheets

APPARATUS FOR TEACHING INSCRIPTION OF CHARACTERS

The present invention relates to apparatus for teaching the basic skill of writing characters.

BACKGROUND

The present invention has incidental similarity to several kinds of well-known apparatus. The invention has features in common with certain electric signs wherein light bulbs distributed along a preformed pattern of straight and curved lines are briefly turned on and then turned off in succession; such signs have eye-catching appeal and are entertaining. The invention also has points of similarity to common electronic calculators in which there is a keyboard, a display panel of light-emitting diodes (LED's) or a liquid-crystal display (LCD) and control apparatus to display a character corresponding to a depressed key; all of the display elements of any one character are actuated concurrently and they stay "on" after the key is released. Certain displays are used (as destination signs of buses) in which characters are displayed by concurrently actuating selected display elements, column by column of a matrix, as are needed for displaying a succession of characters.

SUMMARY OF THE INVENTION

The present invention involves apparatus for teaching children and others how to write characters, notably upper and lower case letters of the alphabet and Arabic numerals. Novel apparatus for this purpose involves means comprising a keyboard for selecting a character that is to be inscribed; an inscription panel for bearing inscription material such as tracing paper; display means underlying the inscription panel for displaying the characters to be inscribed; and control means for controlling the formation of the displayed characters a bit at a time, so as to guide the user in making character-forming strokes. The inscription panel and the display means may be combined into a single composite panel.

The keyboard may have one set of keys for teaching the inscription of one set of characters, e.g. capital letters. Another set of keys may be included for a second set of characters, e.g. numerals. Keyboard selection may involve a key corresponding to each character, but selection of a character may also involve a combination of keys, notably (as in typewriters) one set of alphabet-keys and a shift key, acting in combination for selecting upper-case letters and lower-case letters.

The inscription panel may be of clear material or it may be of diffusing material, but it should be an efficient light transmitter. It should be firm for providing the support needed for withstanding the pressure applied in executing inscription strokes.

The display means may assume various forms; it is made up of an array of devices capable of assuming visually contrasting states, an inactive state and an actuated state. These devices may best be light-emitting devices, especially solid-state light-emitting diodes (LED's). Similarly, an array of light-emitting transistors may be used, or small incandescent light bulbs or neon bulbs. As an alternative, the display means may comprise a liquid-crystal display (LCD) which is not ordinarily light-emitting but has visually contrasting "on" and "off" states.

The character-display devices are arranged in a manner which is suitable for forming guides to be followed in inscribing any and all of a set of characters. A common form of character display consists of rows and columns of LED's, in a rectangular matrix or a matrix of rows and slant columns. Such matrixes may be modified to add actuable devices to the rows and columns, and those rows and columns may be modified to omit actuable display devices that are not needed for forming all of the characters to be displayed.

The control apparatus selects and actuates the display devices in sequence, and the sequential rate is regulated so that the sequentially actuable display devices of the display can be followed conveniently in inscribing each selected character. Thus, when the capital letter "H" has been selected, three strokes are to be inscribed one after another; and display devices are actuated sequentially as a guide to be followed in inscribing one stroke, and then the second and third strokes of the "H". Moreover, the rate of sequential actuation of the display devices is regulated so as to be appropriate for guiding the execution of the inscription strokes.

Display devices that have been actuated should remain in their actuated states at least long enough to provide a visual display of part or all of a character. It may be considered sufficient to actuate a succession of display devices of a portion of a character and to restore those devices to their inactive state as actuation of the sequence of display devices of the whole character proceeds. In the illustrative and exemplary embodiment of the invention described in detail below, the control apparatus maintains each actuated display device in its actuated state at least until display of the progressively developed character has been completed. The educational effect is enhanced by maintaining the display of the selected and progressively formed character until some time after display of the whole character has been completed.

The control apparatus in the illustrative embodiment includes, for each character to be displayed, a means for storing identifications of all the actuable devices to be used in displaying the respective character, and those identifications are arranged in the storage means to become effective in the sequence needed for forming the inscription-guiding stroke or strokes.

To illustrate that concept, it may be considered that the control apparatus assumes the form of an electromechanical assembly of switching devices wired in a network to produce the novel results. For example, the network may include a series of stepping switches or decks of a multiple-deck stepping switch each of which represents a corresponding character to be displayed. A key of key combination selects the switch or deck corresponding to the selected character. The successive contacts of such switch or switch deck are connected to turn "on" or otherwise actuate the display devices sequentially in the order that is to be followed in executing the inscription strokes for writing the selected character. Each device of the display, after being actuated by a switch contact, is to be maintained "on" on or in its actuated state (by suitable design of the stepping switches or by adding a bi-stable relay to each display device) until part or all of the character display has been developed. Each stepping switch or switch deck and its wiring to particular display devices represents a means for identifying those actuable display devices that are to be actuated for displaying a character selected by a key or combination of keys of the keyboard. Means should be included for regulating operation of the stepping switch or switch deck to a rate appropriate for the successively actuated display devices to be followed as a guide for inscription strokes.

The eminently practical illustrative embodiment of the invention that is shown in the accompanying drawings and described in detail below exemplifies various aspects of the invention. That embodiment includes a keyboard for selecting a character to be displayed, an inscription panel, an array of actuable devices underlying the inscription panel, and control apparatus responsive to the keyboard for selecting the necessary actuable devices and actuating them in that sequence and at that rate of sequencing that may be followed conveniently in writing the selected character on a writing medium supported by the inscription panel. In the illustrative apparatus, the control apparatus utilizes electronic computer technology for selectively actuating the display devices, determining the sequence of their being actuated, and regulating the sequencing so that the display devices can readily be followed as an inscription guide. Storage is provided, separately for each character to be displayed, containing identifications of all those display devices that are to be actuated in displaying each selected character; those identifications are accessed in that sequence which results in the display devices being actuated progressively along inscription strokes, and the rate of sequencing is regulated so that the actuated devices can readily be followed as they are actuated in sequence. In the illustrative control apparatus, each displayed character is retained on display well after the progressive formation of the character has been completed.

The intended use of the novel apparatus involves inscription material. In concept, the inscription panel itself can have an upper surface having a special finish for use with markers whose marks are easily wiped away. Tracing paper is a distinctly preferred inscription medium; the success record of a child in using the apparatus can be preserved. It is of special advantage for a rolled-up strip of tracing paper to be contained at the right side of the display assembly, being at the right of the recognizably upright character displayed. The strip of tracing paper is then drawn over the inscription panel, to the left. A succession of letters can be inscribed on the strip to form words; the strip with each newly inscribed character may be drawn to the left of the inscription panel, and another character can be inscribed to the right of the character that was last written on the strip.

The accompanying drawings show an exemplary embodiment of various aspects of the present invention. However, the embodiment shown is illustrative; it is subject to a range of modifications and substitutions within the spirit of the invention.

Figure 1:
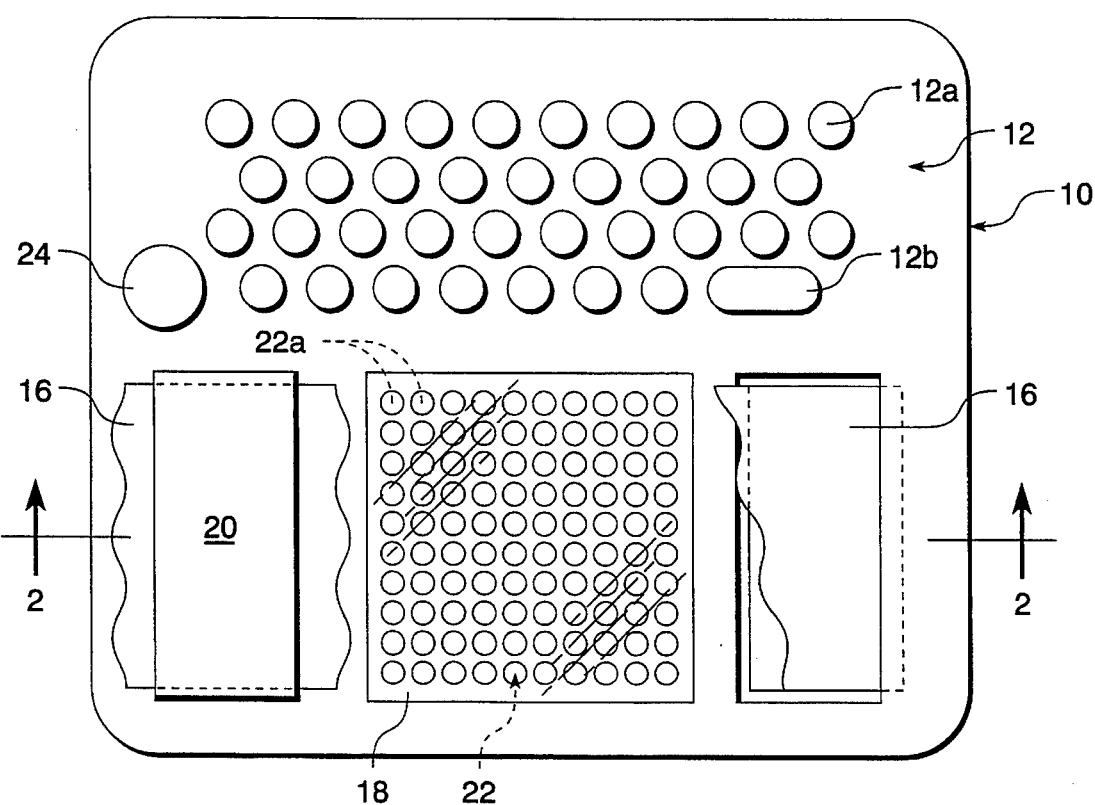
FIG. 1 is a top plan view of a structure utilized in an illustrative embodiment of the invention.
Figure 2:
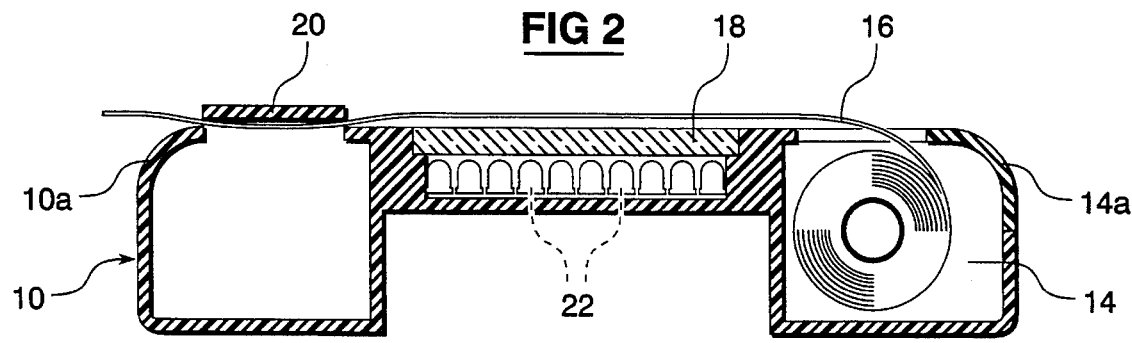
FIG. 2 is a vertical cross-section of the structure of FIG. 1 as seen at the plane 2—2 of FIG. 1.

Referring to the drawings, a base 10 as of molded plastic includes a keyboard 12 comprising respective alphabetic selection keys 12a which, in combination with a shift key 12b, enable the user to select either upper case or lower case letters of the alphabet. Numerical, symbol and other character selection keys are contemplated. Base 10 includes a pocket 14 for containing a roll of inscription material such as a strip of vellum or other tracing paper 16. Cover 14a is secured to the top of base 10. as a cover for pocket 14. The cover is removable for replenishing the supply of inscription material but otherwise it is fixed to base 10.

A light-transmitting inscription panel 18 of stiff transparent or translucent material underlies strip 16 of inscription material; this panel withstands anticipated inscription pressure that may be substantial. Strip 16 is threaded under a guide 20 which is integral with base 10. A sharp edge 10a may be used for easily tearing strip 16.

A display panel 22 underlies protective inscription panel 18. Panels 18 and 22 may be unified; they are secured to base 10. As indicated above, panel 22 may take various forms that comprise an assembly of elements or devices that have visually contrasting states when inactive and when actuated. For example, panel 22 may be a liquid-crystal display (LCD). In the illustrative embodiment, panel 22 consists of an assembly of light-emitting diodes (LED's) 22a arranged as a matrix of rows and columns. These diodes in their inactive state are "off"; when active or "on", they emit light Alternatively, they may be incandescent or gaseous light bulbs. Characters are formed by actuating or turning "on" those LED's that closely approximate the lines of the character. As displayed by panel 22, legible characters are upright, as viewed in FIG. 1. The roll of paper 16 is at the right of panels 18 and 22. After a character has been inscribed, strip 16 is drawn to the left; and the next character that is inscribed is at the right of the previously inscribed character. By repeating the process, names and words can be inscribed on strip 16.

When a character is to be inscribed, it is selected by pressing an alphabetic key 12a of the keyboard, or the character to be inscribed may be selected by pressing both an alphabetic key 12a and shift key 12b. Character selection by the key or combination of keys to control the CPU may utilize means typically found in word processors.

Figure 3A:
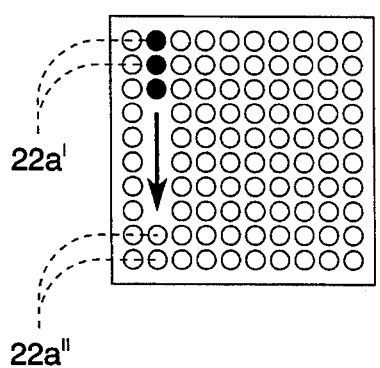
FIGS. 3A, 3B and 3C are views of an array of LED's, forming a portion of the structure of FIGS. 1 and 2, showing the progressive development of a character to be written on the writing material in FIGS. 1 and 2.
Figure 3B:
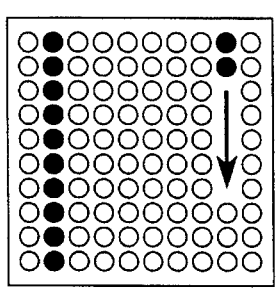
Figure 3C:
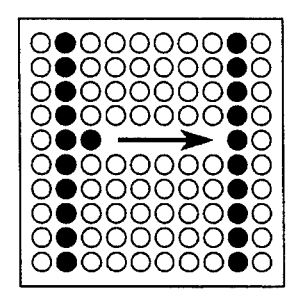

The manner of display of a selected character is distinctive in the present apparatus. As seen in FIGS. 3A, 3B and 3C, three series of display devices are actuated in sequence, as guides for making the strokes of the character "H". The actuated devices in these views are shown as dark devices 22a'; the display devices in their inactive states are designated 22a". The first and second inscription strokes are guided by devices 22a that are actuated sequentially as indicated by the vertical arrows in FIGS. 3A and 3B; the final,inscription stroke is guided by display devices 22a that are actuated sequentially as indicated by the horizontal arrow in FIG. 3C. There is a brief delay between the moment when any one device is actuated and the moment when the next-adjacent device 22a is actuated. The delay is made appropriate for the user to follow the newly actuated devices 22a in executing the inscription stroke(s) of the selected character. A knob 24 in FIG. 1 enables the user to regulate the rate of sequencing in the actuation of the display devices.

Figure 4:
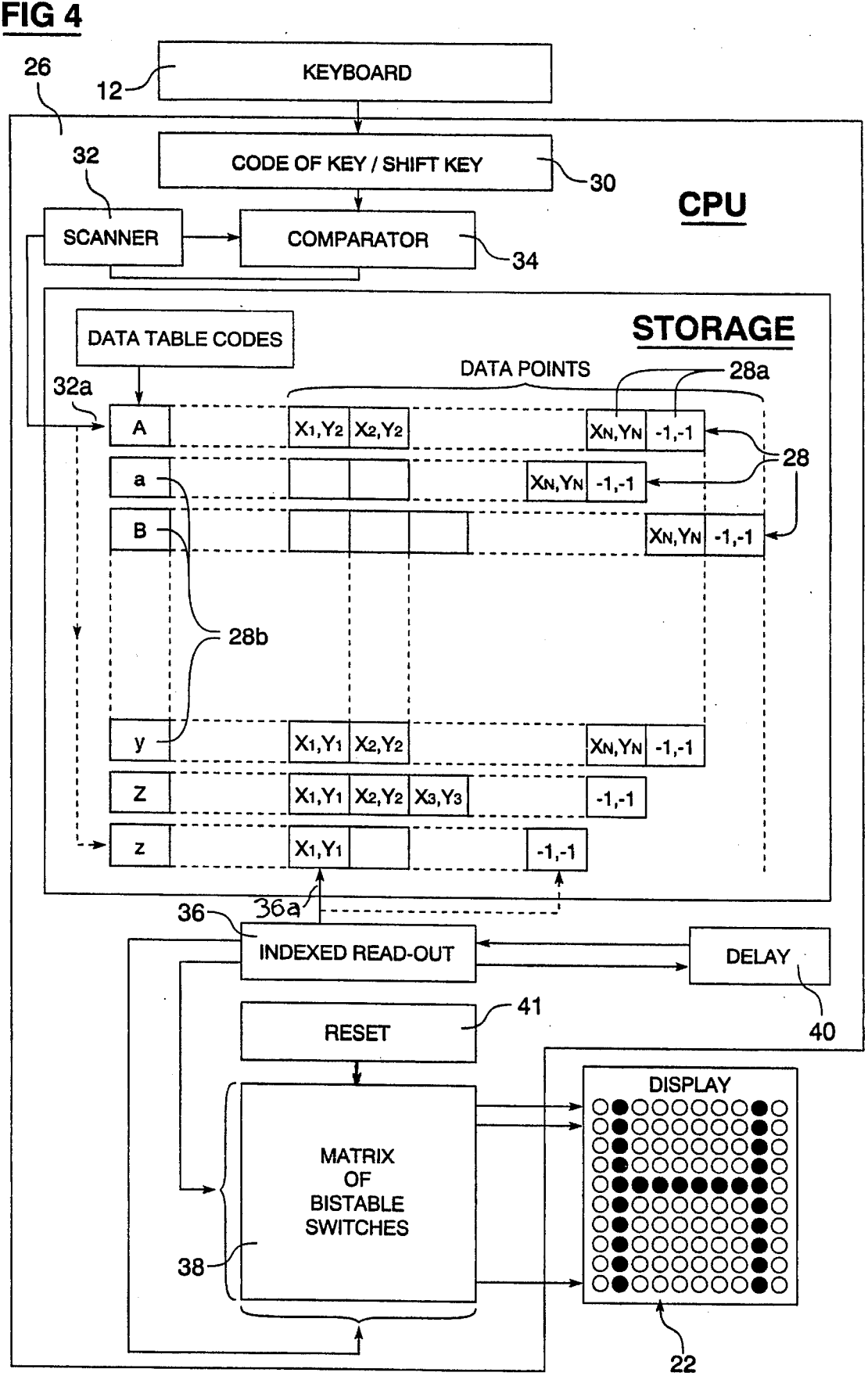
FIG. 4 is a block diagram representing control apparatus for developing the display of the character selected by the keyboard of FIGS. 1 and 2 to be developed progressively on the LED display shown there.

FIG. 4 diagrammatically shows control apparatus 26 that responds to keyboard 12 for actuating the display devices 22a of display 22. A central processing unit CPU in FIG. 4 serves this purpose.

Each actuable display device 22a is identifiable in the CPU by the coordinates of the matrix 22. Whether a rectangular matrix or some other configuration of actuable devices is used, each actuable device has its own identification, usually its coordinates. The storage in the CPU contains a data-point table 28 that identifies devices 22a to be actuated in response to actuation of a key or combination of keys. A separate data table is provided in CPU 26 for each character selected by the keyboard. For example, the display devices 22a in the 5×7 matrix 22 in FIG. 4 may be actuated in the succession needed as a guide for writing "H" by storing, as seven successive data points 28a, the coordinates of the first-through-seventh display devices 22a from top to bottom of the first vertical column in matrix 22; then storing, as the eighth-through-fourteenth data points 28a, the coordinates of the right-hand vertical column of display devices 22a from top to bottom of the matrix; and finally storing, as successive data points 28a, the coordinates of the successive display devices 22a from left to right halfway down from the top of the matrix.

There are as many stored tables 28 of data points 28a as there are characters to be displayed. The data points 28a of each table are accessed in the same sequence as the actuable display devices 22a which are to be energized in sequence. This is the sequence to be followed in inscribing the character corresponding to the selected table of data points.

Each table of data points is identified by a stored code 28b corresponding to the code of the key or key combination used to select the character. The code of depressed key or key combination is stored in a register that identifies each table of data points. Index 32a of scanner 32 scans the stored data table codes 28b until comparator 34 finds a match. This signifies that the table of data points matching the pressed key or key combination has been found; scanning of the data-point tables is halted, and the data points of that table are read out in time-delayed succession.

The CPU includes a read-out scanner 36 having an index 36a that is initialized when a key is depressed; the advancing index causes the successive read-out of the data points of the selected table. Those data points identify—and activate— bistable devices in matrix 38 such as flip-flops or bistable electronic relays, corresponding to the actuable display devices 22a in matrix 22. Accordingly, as each data point in the table is momentarily made effective to select a bistable device in matrix 38, that bistable device assumes and thereafter maintains its actuated state. The corresponding display device 22a is thus activated, and it is maintained actuated by its corresponding bistable device in matrix 38.

As indicated above, the read-out index 36 accesses the data points 28a of the selected data table 28 in sequence. A delay device 40 regulates a time interval between the read-out of any data point and the next. This delayed sequencing of the read-out of data points 28a—and the correspondingly delayed actuation of selected display devices 22a—takes place at a rate appropriate to be followed by a person executing the character-inscribing strokes. Delay device 40 may be adjustably controlled by knob 24 (FIG. 1). For a young child, the display devices as they are turned on should be sequenced at a slow rate, so that they can be followed by the child as each inscription stroke is being made. The rate of sequencing can be increased for guiding more rapid inscription stroke(s).

Each newly actuated (turned "on") display device 22a remains "on" on while the next display device, and the next, are being turned on. In this way, multiple display devices in their actuated ("on") state form a growing series of display devices which guide the inscription stroke(s). In the described apparatus, bistable devices in matrix 38 maintain the actuated ("on") states of display devices that have been turned "on". The entire selected character is displayed when the last data point causes actuation of the last display device of the selected character. Allowing the entire selected character to remain displayed by selected display devices 22a in their actuated state enhances the educational experience.

The apparatus includes a reset control 41 for activating the "reset" inputs of all the bistable devices in matrix 38. The effect of the reset operation is to restore any actuated or "on" display device 22a to its "off" or inactive state. The display matrix 22 is then in condition to display another selected character. Reset 41 is actuated incidental to operation of the character-selecting key or combination of keys.

The mode of operation of the illustrative apparatus, summarized, involves development of the display of a selected character, one illuminated a bit at a time, in the sequence to be followed for inscribing a selected character; the sequencing rate is appropriate for the character to be inscribed as the successive bits of the display are activated. Once a bit of the display is "on", it remains "on" so that when the final bit is illuminated, the entire character is displayed and it remains in its "on" state afterward; it is turned off upon selection of another character to be displayed.

Other modes of operation are contemplated. For example, portions of a developed character display may be reset while further portions of the character display are being developed. One alternative mode of reset of the bistable devices of matrix 38 may be accomplished by adding a "reset" index (not shown) trailing (by eight data points, for example) the read-out index 36 described above. In that configuration of the apparatus, early developed portions of the character display become inactive or turned "off" as additional inscription-guiding bits of the character display are actuated or turned "on"; a series of devices 22a remain in their actuated state or "on", providing a sustained inscription guide to be followed.

Figure 5:
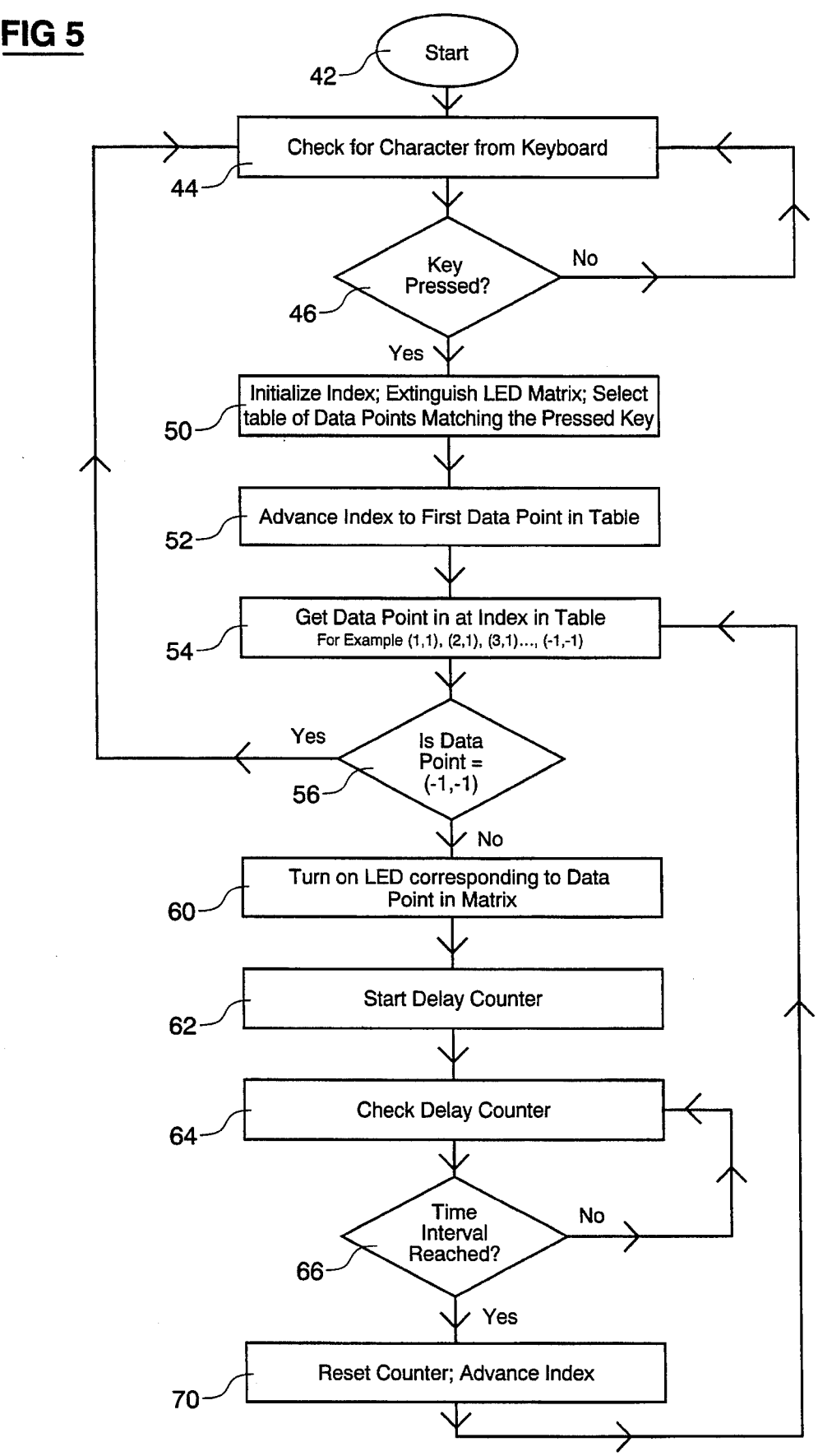
FIG. 5 is a flow chart illustrating the operation of the control apparatus of FIG. 4.

FIG. 5 is a flow chart of most of the operation of CPU 36. After activation of the Start block 42, the "wait" block 44 is in condition to receive interrupts. Decision block 46 tests whether a key or key combination has provided a character-selection code. When the test result is "yes", an interrupt from block 44 drops to block 50, to perform a few functions. (Block 50 might have been subdivided into a succession of blocks for performing the indicated functions.) The CPU index is initialized; the "off" or inactive state of all "on" LED's 22a is restored, and the inactive state of all the other LED's of the matrix is affirmed; and the CPU locates that table of data points which has the stored code 28b that matches the character-selection code obtained from the keyboard.

The interrupt from block 50 drops to block 52, advancing the index of the CPU to the first of the data points 28a of the selected table 28 of data point codes. All of the tables end with a symbolic terminal data-point code (-1, -1). As a routine, decision block 56 tests whether the data point at the read-out index is (-1, -1). Of course, the result is "no" at the first stored code 28a representing the first LED 22a to be turned "on" in developing the display of the selected character; consequently, the interrupt drops to block 60, actuating or turning "on" the LED identified by the first data point. (The term "actuated" applies to emitting elements of a display such as an LED panel or a panel of light bulbs, and to elements as in a LCD that may not be intrinsically light-emitting, but which are components of a developing display of the selected character.)

In ordinary operation of a CPU, the index would in effect advance instantly to the next and succeeding data points of the selected table; the result would be to turn on instantly all of the LED's corresponding to the data points of the selected table. For present purposes, delays are introduced between the instant when any display device is actuated and the instant when the next display device of a series is actuated, so that the display of actuated devices is developed gradually in a manner that may be followed for inscribing the selected character. One way of introducing the delay is to have the interrupt from block 60 start a delay timer. In computers, one way to introduce a time delay (when needed) is to use a counter that counts pulses from an internal high-frequency source of pulses and emits a signal when a preset count is reached. Such a counter is used in FIG. 5 as delay 40 of FIG. 4. The counter is started by an interrupt from block 60 to block 62. Starting the counter causes an interrupt to drop to block 64. Decision block 66 repeatedly checks the-count in the delay counter until a "yes" decision is reached. This occurs when a preset value in the counter has been reached, or when an initial value in the counter has been reduced to zero. That value is adjustable, and delay 40 (FIG. 4) is thus adjustable under control of knob 24 (FIG. 1).

When the preset time-interval is reached, an interrupt drops from decision block 66 to block 70, causing the counter to be reset and causing the read-out index 36a (FIG. 4) to advance to the next-following data point 28a of the selected table. An interrupt from block 70 drops to block 54, to get the data of the newly selected data point storage 28a, then repeating the cycle of steps from block 54 via block 70 and back to block 54.

Ultimately, development of the entire character display is completed. When the next interrupt from block 54 reaches block 56, the data point code is (-1, -1). An interrupt from decision block 56 reaches block 44. Nothing further happens until a new character selection code reaches block 44. Consequently, the fully developed display of any selected character remains on display until a new selection is made by operation of the keyboard. Allowing the developed display of a selected character to remain in effect is an educational advantage. Thereafter, when the keyboard is actuated to select the next character, an interrupt from block 44 to block 50 causes the bistable devices in matrix 38 to be restored to their initial states in which the actuable devices 22a are inactive or "off".

It is self-evident that the illustrative embodiment of the invention detailed above is amenable to varied substitutions and rearrangement. Consequently, the appended claims should be construed broadly in accordance with the true spirit and scope of the invention.

I claim:

1. Teaching apparatus for guiding a person in executing one or more strokes for inscribing any selected character of a set of characters, said apparatus including a keyboard having means comprising a key or a combination of keys for selecting each character of the set of characters to be inscribed, character inscription means including a light-transmitting panel for supporting inscription material and display means having a bottom and having right and left sides, said display means underlying said panel for displaying a selected character upright relative to said bottom, said display means including an array of devices having visually contrasting inactive and actuated states, said devices being distributed along lines to be followed by a person in executing strokes for inscribing said set of characters, and selective means responsive to said character selecting means for actuating selected devices of said display means so as to display said selected character, said selective means including means causing the actuation of said selected devices to be sequential in accordance with strokes to be executed by a person in inscribing the selected character and at a sequencing rate appropriate to guide the execution of such strokes, and said apparatus having means for supporting a roll of tracing material at the right of the display means in readiness to be drawn to the left and across said inscription-material-supporting panel, whereby a left-to-right sequence of upright characters may be inscribed on the tracing material by drawing the tracing material bearing one or more previously inscribed characters across said panel to the left and concurrently positioning a fresh area of the tracing material over said panel in readiness for another character to be inscribed to the right of the last previously inscribed character.

2. The apparatus of either claim 1, wherein said selective means includes, for each character to be displayed, storage means for storing identifications of those devices that are to be actuated for displaying such character and means for utilizing said identifications in selecting the devices to be actuated.

* * * * *